United States Patent [19]

Newkirk et al.

[11] Patent Number: 4,595,446

[45] Date of Patent: Jun. 17, 1986

[54] SOLVENT BONDING PROCESS UTILIZING SPRAY-MIST

[75] Inventors: Raymond K. Newkirk, Mound; Ronald J. Dickmeyer, Medicine Lake, both of Minn.

[73] Assignee: Tape, Inc., Minneapolis, Minn.

[21] Appl. No.: 726,783

[22] Filed: Apr. 24, 1985

[51] Int. Cl.$^4$ .............................................. B32B 31/00
[52] U.S. Cl. ..................... 156/356; 118/301; 118/323; 118/326; 118/504; 156/228; 156/556; 156/578
[58] Field of Search ............... 156/308.6, 308.8, 309.3, 156/556, 538, 578, 228, 350, 362–364, 356; 118/301, 326, 504, 323

[56] References Cited

U.S. PATENT DOCUMENTS

| | | | |
|---|---|---|---|
| 2,695,592 | 11/1954 | Szczepanski | 118/301 |
| 3,005,742 | 10/1961 | Kennedy, Jr. | 156/187 X |
| 3,156,608 | 11/1964 | Kamins et al. | 156/308.6 |
| 3,445,315 | 5/1969 | Strauss | 156/575 |
| 3,479,986 | 11/1969 | Hoover | 156/578 |
| 3,518,966 | 7/1970 | Hutchinson | 118/301 |
| 3,769,136 | 10/1973 | Ospelt | 156/308.6 X |
| 4,310,376 | 1/1982 | Ebina et al. | 156/228 X |

Primary Examiner—David Simmons
Attorney, Agent, or Firm—Orrin M. Haugen; Thomas J. Nikolai

[57] ABSTRACT

Apparatus for solvent bonding surfaces of thermal plastic members, one to another, which includes a working solvent spray enclosure with work retaining rack means mounted within the enclosure to removably receive workpieces thereon. Mask retaining means are disposed within the enclosure for masking preselected portions of the workpieces, with the masks being arranged to provide face-to-face contact and bonding between the workpieces held within the work retaining racks. A solvent spray apparatus is disposed within the enclosure and includes a spray head with nozzles directed toward the workpieces for generating the spray mist of solvent onto the surfaces of the mask and exposed portions of the workpiece. Carriage means are provided for transporting the solvent spray apparatus along a linear path generally between opposed surfaces of workpieces held within the enclosure, with the carriage means being arranged to direct a substantially uniform spray of solvent onto the workpieces. Means are provided for transporting the masks away from the surfaces of the workpieces, and second carriage means are provided for transporting at least one of the workpieces along a transport access normal to the bonding plane of the workpieces for carrying the workpieces into face-to-face contact for bonding therebetween.

6 Claims, 3 Drawing Figures

SOLVENT BONDING PROCESS UTILIZING SPRAY-MIST

BACKGROUND OF THE INVENTION

The present invention relates generally to apparatus for the application of adhesives or solvents to the surfaces of thermoplastic materials to be bonded together, one to the other, and more particularly to apparatus for the spray application of adhesives, either as film forming materials held in a solvent solution or as solvents per se to surfaces of thermoplastic materials, such as polystyrene in either sheet or foamed form, with the spray application being controlled within a spray enclosure, and being controllably applied to surfaces of the workpieces to be bonded. The present apparatus is particularly adapted for use in connection with solvent bonding of polystyrene, including foamed polystyrene, and particularly wherein solvents such as trichloroethylene or other more dangerous solvents may be employed, and wherein the atmosphere from the spray enclosure is controllably monitored so as to avoid contamination of the work area, and also to avoid pollution of the environment.

Solvent bonding of workpieces such as surfaces of typical thermoplastic articles including such articles in sheet form, complex shaped articles such as vacuum-formed articles or molded articles, and including solid as well as foamed thermoplastics has been known and highly utilized in the past. Typically, the surfaces to be bonded are treated with an application of adhesive in a solvent solution or a solvent per se so that the surfaces of the workpiece portions may be bonded together in face-to-face relationship. The means of solvent and adhesive application including spray application, brush application, dipping and the like. Typically too, and in solvent application operations, solvent has been applied without regard to the quantity of solvent employed, the manner of disposing of the solvent, or the manner in which the environment is protected from contamination due to the inevitable vaporization or volatilization of the solvent.

Solvent bonding of foamed articles has generally been regarded as an extremely difficult or, in some instances, an impossible operation. However, in accordance with the aspects of the present invention, it has been found possible to bond foamed polystyrene workpieces together without adversely affecting the quality of the product and with a firm bond created. Such operations are made possible in accordance with the various aspects of the present invention.

SUMMARY OF THE INVENTION

The present invention provides a technique whereby solvent and/or adhesive bonding operations may be expeditiously undertaken by means of the spray application of a fine mist of solvent and/or adhesive solutions onto the surfaces to be bonded, and with the bonding material being applied only to the area of the surfaces to be bonded, and with the remaining surfaces being shielded from exposure to the spray by a mask preferably a heated mask. In order to further conserve and preserve the solvent and/or adhesive solution, means may be provided to program the rate of travel of the spray mechanism across and between the surfaces to be bonded, so that only a minimum amount of solvent required for the operation is utilized, such as, for example, by means of programming the rate of the motion of the spray mechanism across the areas to be bonded so that those areas which are substantially totally masked are either traversed rapidly or traversed while the spray mist is inactive, while those areas of the mask with exposed zones are traversed at a slower and controllable rate depending upon the requirements of the thermoplastic system being employed. Following exposure to the solvent, the spraying system and the masks are removed or otherwise displaced from the exposed workpiece surfaces, and the tooling holding the individual workpieces is advanced so that the surfaces of the workpieces to be joined are brought into face-to-face contact, thereby achieving the desired bonding relationship between the parts. The masks, preferably being heated so as to drive off the solvent solution, provide an improved and fine delineation of the mask-work interface areas. A modest degree of heating of the masks assists in removal of the spray solution, thereby reducing, if not avoiding, the zones where the applied material may accumulate.

In order to preserve the quality of the ambient, the entire operation is undertaken within a working enclosure. A shroud is placed around the work area so that the solvent and/or adhesive solution being sprayed is collected for re-use, or otherwise disposed of in a controlled fashion. The enclosure is also vented to atmosphere through suitable solvent collection means so that solvent emissions are held to a controlled minimum. By virtue of the careful management and control of solvents, it has been found that improved bonding may be achieved through utilization of a minimum amount of solvent, and through appropriate conservation of the solvents employed.

Therefore, it is a primary object of the present invention to provide an improved system or apparatus for the solvent and/or adhesive bonding of surfaces of thermoplastic materials, one to another, wherein carriage means are provided for transporting a spray apparatus between opposed surfaces of workpieces to be joined and for directing a substantially uniform application of a spray mist onto the surfaces to be bonded.

It is yet a further object of the present invention to provide an improved apparatus for solvent bonding surfaces of thermoplastic workpieces together, wherein the apparatus includes an enclosure into which workpieces are mounted, and across which a spray apparatus is moved, with the spray apparatus including a spray-head for generating a mist for direct application to the surfaces of the masked workpiece, wherein means may be provided to heat the mask so as to assist in driving the solvent material from the mask, and wherein means are provided to transport the solvent-exposed workpieces into their desired face-to-face finished bonded relationship.

It is yet a further object of the present invention to provide an improved apparatus for solvent bonding surfaces of thermoplastic materials together, wherein means are provided for protecting the ambient from exposure to substantial quantities of solvent vapors, and whereby the system further protects the environment from pollution due to exhaustion of substantial quantities of solvent thereinto through salvaging and reuse, rather than immediate loss and/or discharge.

Other and further objects of the present invention will become apparent to those skilled in the art upon a study of the following specification, appended claims, and accompanying drawings.

IN THE DRAWINGS

FIG. 1 is a side elevational view, in partial section, illustrating the spraying chamber including the mist-generating solvent sprayer disposed and confined between oppositely opposed mask-workpiece holding assemblies, with FIG. 1 being taken generally along the line and in the direction of the arrows 1—1 of FIG. 2;

FIG. 2 is a top view, in partial cutaway, illustrating the spraying apparatus as it appears when positioned between opposed mask-workpieces, with FIG. 2 being taken along the line and in the direction of the arrows 2—2 of FIG. 1; and FIG. 3 is a detailed top view in partial cutaway, similar to FIG. 2, but wherein the spray apparatus is shown in its retracted position and the workpiece holding assemblies are shown in their bonding position.

DESCRIPTION OF THE PREFERRED EMBODIMENT

Figure 1:
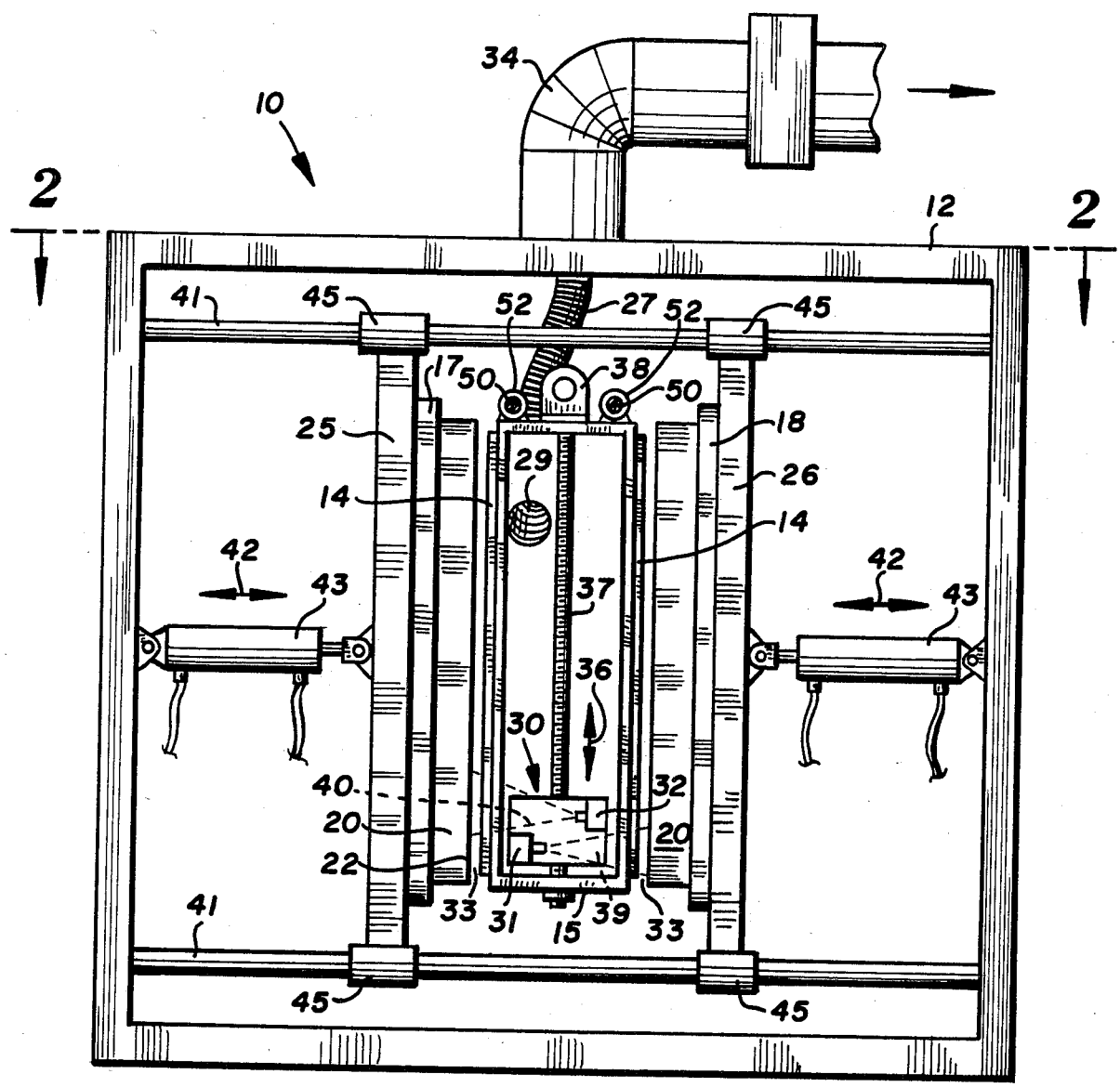
Figure 2:
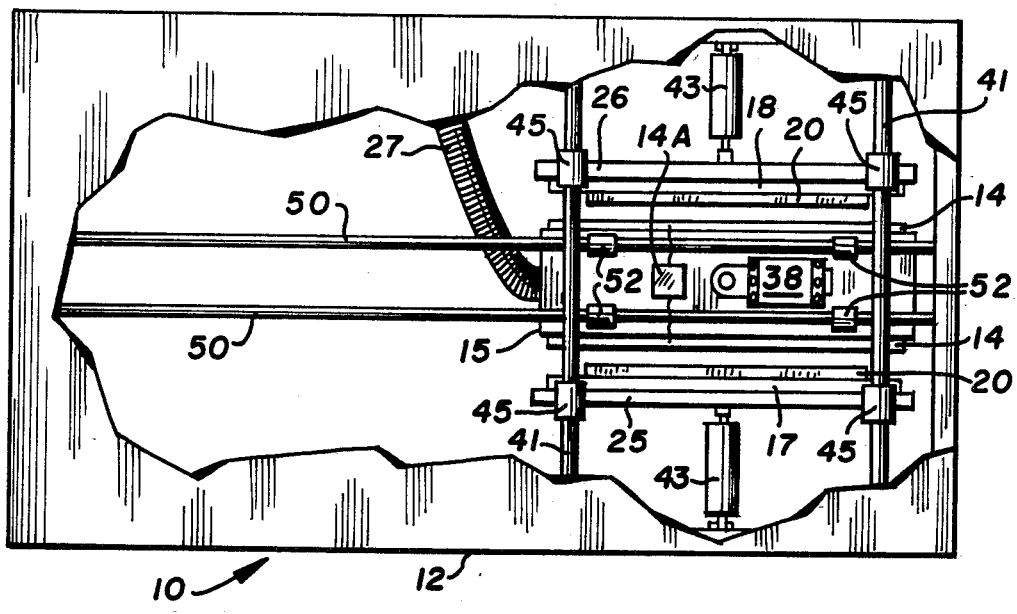

In accordance with the preferred embodiment of the present invention, and with particular attention being directed to FIGS. 1 and 2 of the drawings, the spray-mist solvent bonding apparatus of the present invention is shown generally at 10. The apparatus includes a sheet metal enclosure 12 that surrounds a spray mask 14 containing sprayer housing 15 and a pair of tooling members 17 and 18 that are positioned opposite the spray masks 14. In order to enhance the work-mask interface, and otherwise delineate the area exposed to the spray, means are preferably provided to heat each of the masks 14 to a desired temperature level. A thermostatic control 14A is preferably utilized to control the flow of electrical energy to the each of the masks 14 in order to control the temperature, and maintain the temperature at a desired elevated level. The tooling members 17 and 18 are utilized for retaining foamed polystyrene parts or workpieces 20 in place, such as within cavities (not shown) formed with the tooling members 17 and 18. The exposed surfaces 22 of the parts to be bonded together are thus positioned adjacent to the spray masks 14.

As should be apparent, the tooling members 17 and 18 are each also removably secured to individual sliding frame members, such as at 25 and 26, so that upon spraying one or more workpieces 20 held in each tooling member 17 and 18, the tooling members 17 and 18 can be switched out and a new batch of workpieces 20 mounted to the frame members 25 and 26 between successive spray sequences.

Solvent spray apparatus generally designated 30 is disposed within the solvent spray housing 15, and includes a pair of spray-head means as at 31 and 32 in the form of nozzles to direct a mist of solvent through the surface of the masks 14 and over the gap 33 and onto the exposed surfaces 22 of the workpieces 20. In order to preserve the quality of the ambient, exhaust duct 34 is in communication with sprayer housing 15 via a flexible vent tube 27 having an inlet 29 opening to the interior of the sprayer housing 15, and may be directed to a solvent recovery system, if desired, as shown schematically at 34 in order to preserve the atmosphere against exhaust of quantities of solvent thereinto.

Also, the workpiece masks 14 are removably held to the sprayer housing 15 and arranged for face-to-face contact with the workpieces 20.

A first carriage means is provided for transporting the solvent spray apparatus 30 along an axis such as at 36, with the axis of travel of the carrier for the solvent spray apparatus 30 being generally midway between the opposed workpiece surfaces 22. This arranges for the spray system 10 to direct a substantially uniform application of solvent mist through the openings of the masks 14 and onto the exposed surface 22 of the workpiece 20.

A column of spray or the generated mist for each spray head 31 and 32 is generally shown in dotted line at 39 and 40. Each column 39 and 40 is preferably rectangular in configuration, and is controlled so as to provide a substantially uniform application of solvent mist onto all exposed surfaces 22 of the workpieces 20.

As a further feature of the invention, the drive means for the solvent spray apparatus may be in the form of a conventional lead screw assembly. The lead screw is shown as at 37, and may be rotatably journaled within the enclosure 15 and driven by variable speed motor 38. The rate of the output shaft of motor 38 will, of course, program the rate of rotation of lead screw 37, which will, in turn, relative to the thread pitch, determine the rate of speed at which the solvent spray apparatus moves across the enclosure 15. If there are portions of the product to be solvent bonded which are free of zones to be bonded, then, those various portions may be traversed at relatively high rates of speed in order to conserve both volumes of solvent, as well as production time. Alternatively, the spray heads 31 and 32 may be periodically turned off.

If desired, the spray apparatus 30 may operate reciprocably. For example, the solvent spray apparatus 30 may, during one cycle, operate continuously along the lead screw 37 with coincidentally arranged pitch axes, first in one direction and then the other, so as to provide a full reciprocable cycle of motion, thereby providing the workpieces 20 with exposure to two individual passes of solvent spray.

The apparatus is also preferably provided with a second carriage means 41 which is arranged to move along an axis of travel as at 42. The second carriage means is preferably in the form of a pair of pneumatic air cylinders 43. Each air cylinder 43 being connected between one side of the enclosure 12 and one of the frame members 25 and 26. By appropriately filling or evacuating air from the air cylinders 43, the framing members 25 and 26 may be caused to position the workpieces 20 adjacent to the masks 14 as shown in FIG. 1 or to withdraw the framing members 25 and 26 to permit removal of the tooling members 17 and 18 and solvent sprayed workpieces 20, each framing member 25 and 26 sliding along the carriage rails 41 via ball bushings 45 mounted at the ends of the framing members 25 and 26 and about the carriage rails 41.

Once the workpieces 20 are sprayed with solvent, the framing members 25 and 26 are further controllable via the air cylinders 43 to move inwardly and cause the sprayed surfaces 22 to be brought into contact with one another and thereby bond to each other. Preliminarily, however, the solvent spray apparatus 30 is withdrawn from between the framing members 25 and 26.

Figure 3:
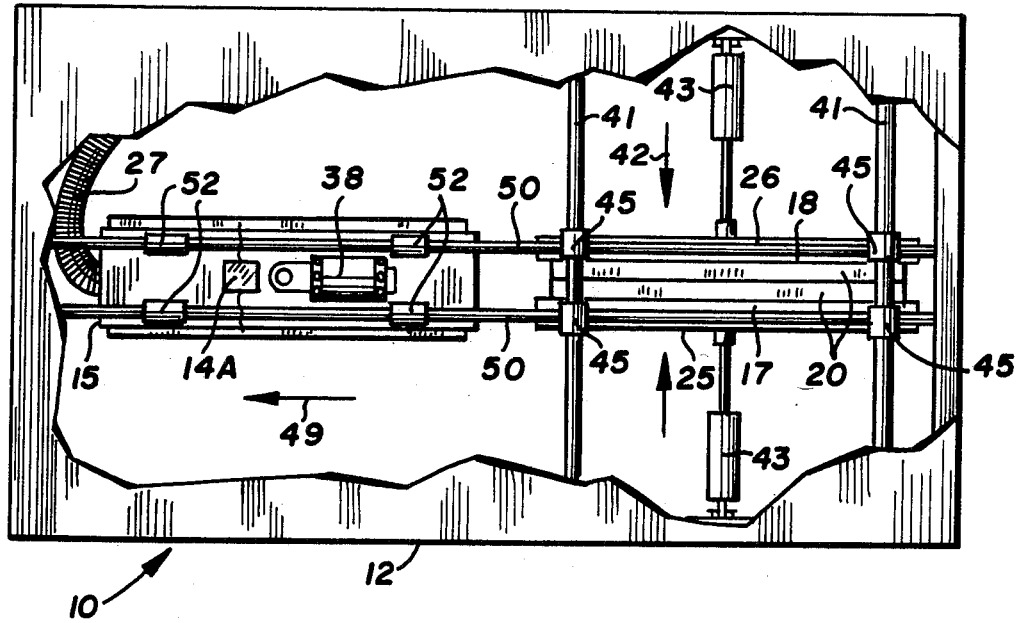

In particular, the relative position of the solvent spray apparatus 30 can be seen by directing attention to FIGS. 2 and 3 and wherein top cutaway views are shown. FIG. 2 depicts the spray apparatus 30 as it appears in FIG. 1, when it is positioned between the workpieces 20. FIG. 3, on the other hand, depicts the spray apparatus 30 in its withdrawn position and with the workpieces 20 brought into bonding contact. From FIG. 2, it is to be noted that the spray apparatus 30 is slidably mounted to slide rails 50 for movement along axis 49 via a number of ball bushings 52 that are mounted therearound and a pneumatic air cylinder (not shown) that, like the air cylinders 43, is coupled between the enclosure 12 and the spray housing 15. Thus, once the workpieces 20 are sprayed, the spray apparatus 30 is retracted to its left-most position and the framing members 25 and 26 are brought together. Once the workpieces 20 have bonded together, one or the other is released from its tooling member 17 or 18, the framing members 25 and 26 are retracted and the bonded workpieces 20 are removed from the other tooling member 17 or 18, which may occur either with the tooling member 17 or 18 in place or upon removal from the enclosure 12.

The spray-mist generating apparatus 30 may be any of a variety of commercially available systems. For example, an airless-spray system may be used in some applications or, in certain other applications, a compressed air sprayer system may be employed. Nozzles together with spray-guide devices are available and mount to the spray heads 31 and 32 so as to appropriately form and control the configuration of the spray columns 39 and 40 generated by the spray apparatus 30. As indicated, it is normally preferred that the spray columns 39 and 40 be generally rectangular in form.

While the apparatus of the present invention is adapted for use with a wide variety of thermoplastic materials, those capable and susceptible of solvent bonding are contemplated. Foamed polystyrene is, of course, a preferred material, and is readily adapted for such solvent bonding. In addition, other thermoplastic materials such as, for example, cellulose acetate or the like may be utilized. For foamed polystyrene parts, a solvent such as trichloroethylene is desired, while for cellulose acetate, a solvent such as mixtures of dimethylphthalate, ethanol, and either acetone or methoxyethyl acetate may be employed. Other arrangements of thermoplastic materials and appropriate solvents are, of course, well known to those of ordinary skill in the art and may be employed in connection with the apparatus of the present invention.

As indicated, the masks 14 are preferably heated to a modest level so as to evaporatively remove residual solvent-mist from the surface of the masks. Typically, the mask temperature should be held at or slightly above the boiling point of the specific solvent being used. Typical boiling points for certain of the solvents listed above are as follows:

| Solvent | Boiling Point |
| --- | --- |
| Methylene chloride | 40.1° C. |
| Trichloroethylene | 86.7° C. |

As indicated, temperatures slightly in excess of these boiling points will normally be preferable for a proper temperature for the masks. Those skilled in the art can readily ascertain the most desirable temperature for a specific mask-workpiece configuration when being treated with a specific solvent or solvent mixture.

While the present invention has been described with respect to its presently preferred embodiment, it is to be recognized that modifications may be made thereto without departing from the spirit and scope of the described invention. Accordingly, the foregoing description should not in any way be interpreted to be self-limiting and the following claims should be interpreted to include all those equivalent embodiments within the spirit and scope thereof.

What is claimed is:

1. Apparatus for solvent bonding surfaces of thermoplastic materials, one to the other, which apparatus comprises:
   (a) a solvent spray enclosure including work retaining rack means mounted therein and arranged to removably receive and retain pairs of workpieces in opposed relation to one another and exhaust means for exhausting gaseous vapor from said enclosure;
   (b) mask means disposed within said solvent spray enclosure and arranged for masking selected surface portions of at least one pair of workpieces held within said work retaining rack means, and means for controllably heating said mask means;
   (c) solvent spray apparatus disposed within said solvent spray enclosure and including spray-head means having at least one spray nozzle operable relative to said mask means and said at least one pair of workpieces for generating a solvent spray mist therefrom and onto selected unmasked surface portions of said workpieces;
   (d) first carriage means for transporting said solvent spray apparatus along an axis generally midway between said opposed pairs of workpieces for directing a substantially uniform application of solvent mist to the unmasked surface portions of said workpieces; and
   (e) second carriage means for transporting said workpieces along a second axis generally normal to said first axis for holding said solvent exposed pairs of workpieces in face-to-face bonding relationship, one to the other.

2. The apparatus as defined in claim 1 being particularly characterized in that said first and second carriage means are arranged for reciprocable operation within said spray enclosure.

3. The apparatus as defined in claim 1 being particularly characterized in that said first carriage means is provided with programmable motion means for controlling the amount of exposure of spray mist for each area of said mask means and workpieces to be covered by said solvent spray mist.

4. The apparatus as defined in claim 1 being particularly characterized in that said thermoplastic is foamed polystyrene.

5. The apparatus as defined in claim 1 being particularly characterized in that said spray-head means produces a rectangular spray pattern covering the full vertical height of each workpiece and an incremental portion of a width dimension of each workpiece.

6. Apparatus for solvent bonding surfaces of thermal plastic materials, one to the other, which apparatus comprises:
   (a) a solvent spray enclosure surrounding first and second framing means positioned in opposed relation to one another, and operable for movement along a first axis; solvent spray means slidably mounted within said spray enclosure between said first and second framing means for programmably distributing a spray mist of solvent therefrom;
   (b) lead screw means mounted for rotation within said solvent spray means and having a solvent spray platform containing a pair of spray nozzles movably mounted on a nut portion thereof and arranged to be carried along an axial length of said lead screw orthogonal to said first axis;

(c) first and second work retaining rack means mounted respectively to said first and second framing means and including first and second holding means for grippingly supporting one or more workpieces from each rack means;

(d) workpiece shrouding masks secured to said solvent spray means for holding said shrouding masks in adjacent face-to-face relation to predetermined surfaces of said workpieces; and (e) carriage means transporting said workpieces toward and away from one another along said first axis and said solvent spray means orthogonally thereto for exposing unmasked portions of said workpieces to said solvent spray mist in a first position and for holding said workpieces in face-to-face bonding relation to one another in a second position.

* * * * *